Patented Dec. 12, 1939

2,182,840

UNITED STATES PATENT OFFICE 2,182,840

SHIP BOTTOM PAINT

Giuseppe Capurro, Union City, N. J.

No Drawing. Application January 4, 1939,
Serial No. 249,275

1 Claim. (Cl. 134—41)

This invention relates to paints, with especial reference to compositions applicable to surfaces subjected to the effects of sea water and marine growths, such as the hulls of ships, boats, wharves, etc.

An object of the invention is to provide a paint-like composition, easily applied by well known methods, that will adhere effectively to metallic and wooden surfaces, forming a firm protective coating of permanent character.

A further feature is the provision of a composition that is highly beneficial to the surface to which it is applied, preventing corrosion and like deterioration and has the further advantage of being destructive to algae, barnacles and other forms of vegetable and marine growths.

Another purpose is to produce a composition that is composed of inexpensive substances and cheaply prepared for use.

These objects of a highly valuable nature, are accomplished by the novel selection of material and the manner of their blending as hereinafter described.

The base of the composition is refined coal tar 36%; with this is incorporated sulphur 28% in a finely divided condition, such as known as flowers of sulphur.

To this is added 7% of resin and 3% of Paris green all in powdered form.

Mixed with the foregoing is 7% of resin dissolved in 19% benzol, all parts by weight.

The term "resin" refers to a vegetable substance obtained by distilling certain species of wood, and is used in a finely pulverized state.

An average mixture is composed of 45 pounds coal tar, refined; 35 pounds sulphur; 8 pounds resin, 4 pounds Paris green, 8 pounds resin dissolved in 25 pounds benzol, 125 pounds total.

This mixture is heated to the boiling point and continued boiling for about one and a half to two hours, whereupon it is ready for use.

The composition is black in color, is impervious to water, adheres without cracking when it dries on the surface, and as a whole possesses in a high degree, all the attributes of an anti-corrosive, non-fouling compound.

Having thus disclosed the invention, including composition, method of manufacture and application, what is claimed as new and sought to secure by Letters Patent, is:

An anti-corrosive, non-fouling composition for surfaces subjected to water, comprising a mixture of coal tar 36 percent, sulphur 28 percent, resin 14 percent, Paris green 3 percent, and benzol 19 percent, all by weight, intimately mixed and boiled not to exceed two hours.

GIUSEPPE CAPURRO.